(12) United States Patent
LaSee

(10) Patent No.: US 6,634,350 B2
(45) Date of Patent: Oct. 21, 2003

(54) BOW FISHING REEL WITH LINE RETAINER

(76) Inventor: Jack LaSee, 308 W. Cedar St., Abbotsford, WI (US) 54405

( * ) Notice: Subject to any disclaimer, the term of this patent is extended or adjusted under 35 U.S.C. 154(b) by 0 days.

(21) Appl. No.: 10/058,899

(22) Filed: Jan. 29, 2002

(65) Prior Publication Data
US 2003/0140912 A1 Jul. 31, 2003

(51) Int. Cl.[7] .................................................. F41B 5/00
(52) U.S. Cl. ............................................. 124/86; 43/19
(58) Field of Search ...................... 43/19, 24; 124/23.1, 124/86, 88

(56) References Cited

U.S. PATENT DOCUMENTS

| | | | | |
|---|---|---|---|---|
| 2,812,756 A | * | 11/1957 | Myers | 124/23.1 |
| 3,216,670 A | * | 11/1965 | Neumiller | 124/23.1 X |
| 3,949,730 A | * | 4/1976 | Schoenberger | 124/23.1 |
| 4,309,974 A | * | 1/1982 | Carter et al. | 124/23.1 |
| 4,383,516 A | | 5/1983 | LaSee | |
| 4,726,348 A | * | 2/1988 | Saunders | 124/23.1 |
| 4,744,347 A | * | 5/1988 | Dodge | 124/86 |
| 4,773,179 A | * | 9/1988 | Corley | 43/19 |
| 4,819,360 A | | 4/1989 | Thomas | |
| 4,905,397 A | | 3/1990 | Juelg, Jr. | |
| 5,033,220 A | | 7/1991 | Phelps | |
| 5,143,044 A | * | 9/1992 | Bourquin | 124/86 X |
| 5,609,147 A | * | 3/1997 | Withorn | 124/86 |

* cited by examiner

Primary Examiner—John A. Ricci
(74) Attorney, Agent, or Firm—Quarles & Brady LLP

(57) ABSTRACT

A line retainer for use with bow fishing reels, which provide extremely low drag on the line, holds the line retained in the bottle so as to reduce the chance of snagging or catching, and yet automatically releases with release of the arrow avoiding the need for manual release as is required by conventional spin casting type reels.

9 Claims, 3 Drawing Sheets

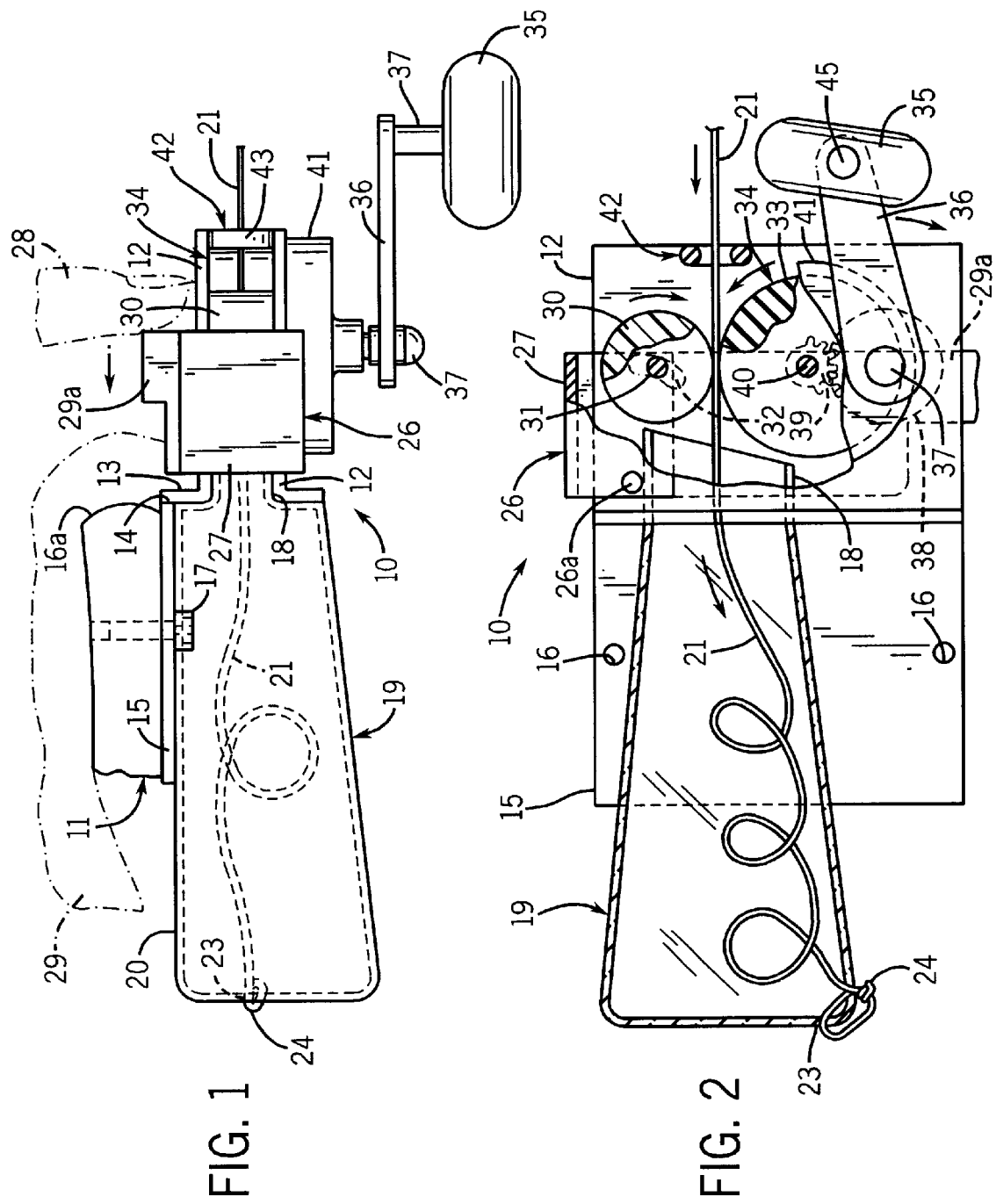

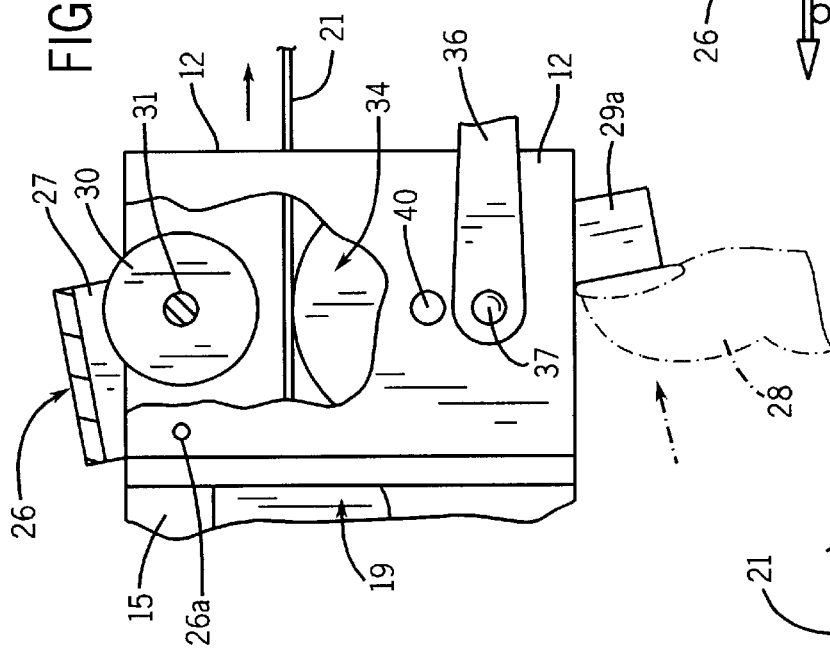
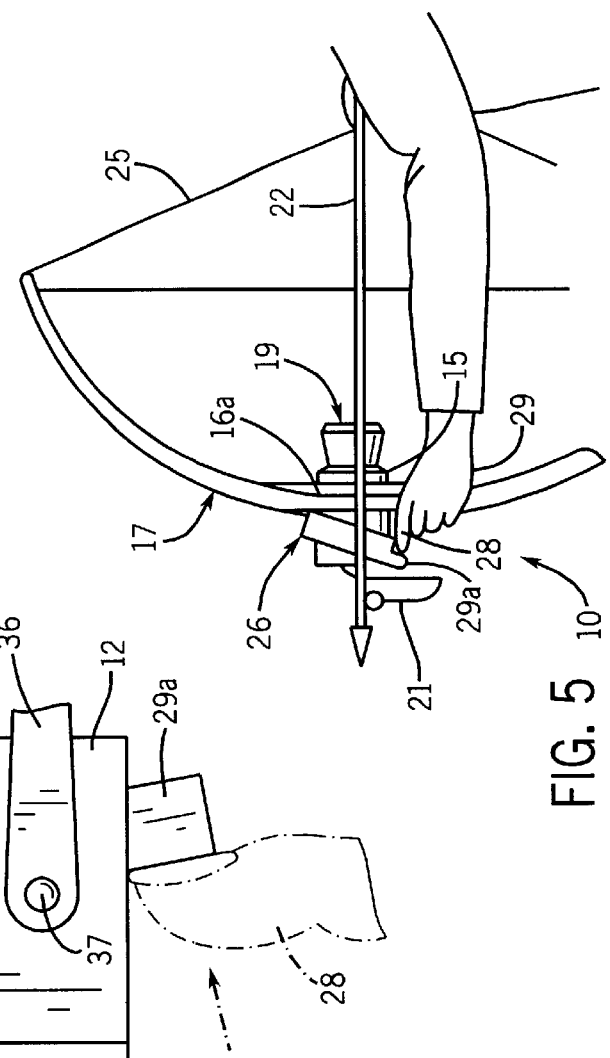
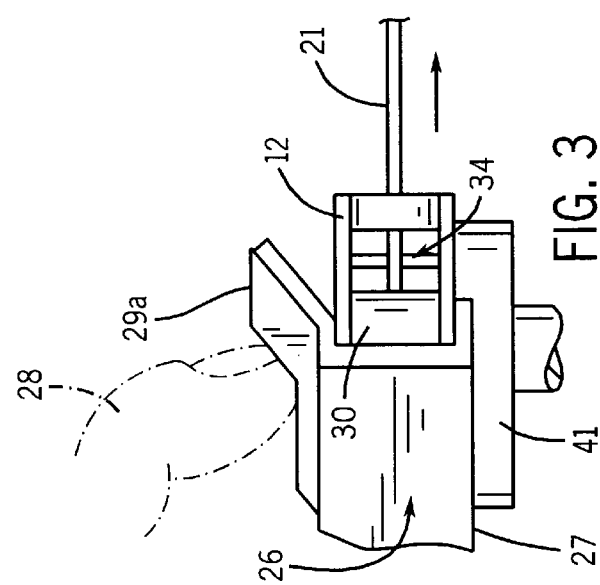

BOW FISHING REEL WITH LINE RETAINER

BACKGROUND OF THE INVENTION

The present invention relates to archery devices and, more particularly, to a bow fishing reel having an improved line retention system.

In bow fishing, an arrow is fitted with a lightweight line which may pay out behind the arrow when the arrow is shot from a bow. The line allows the arrow and/or fish, to be retrieved after the shot.

The line may be stored on a spin casting fishing reel which uses a movable bail and roller to wind the line about spool. The bail may be released to allow uncoiling of the wrapped line from the spool. The spool remains stationary as the line is withdrawn by the arrow. In this way, the inertia of the spool and contained line does slow the arrow.

A second drawback to this type of fishing reel is that the user may forget to release the bail. In these circumstances, the line may break or the arrow may stretch the line and recoil striking the shooter. A third drawback is that the process of winding the line on the spool and then releasing it without unwinding of the spool imparts a twist to the line that may make it prone to tangling.

These problems are eliminated by a novel bow fishing reel described in U.S. Pat. No. 4,383,516, assigned to the assignee of the present invention, in which the line is loosely coiled in a bottle. After the line is pulled from the bottle by the arrow, opposed rubber rollers at the mouth of the bottle clamp together about the line and push it into the bottle under the urging a geared crank handle.

Like the spin casting reel, the bottle-style reel eliminates the need for the arrow to overcome the rotational inertia of a spool on which the line is wound. Unlike the spin casting reel, however, the bottle-style reel does not require the user to remember to release a bail prior to the shot and eliminates the problem of the reel imparting a twist to the line.

The extremely low drag on the line provided by the bottle-style reel increases the possibility the line may be inadvertently pulled from the bottle to snag or catch on vegetation, equipment or the like. While it is possible to lock the line against discharge from the bottle by a number of mechanisms, if the user forgets to unlock the line, the same problems described above with respect to the bail on a spin casting reel can occur.

BRIEF SUMMARY OF THE INVENTION

The present invention provides a special line retainer for a bottle-style reel that provides a suitably light retention force to complement the low drag of the bottle-style reel, but one that is nevertheless sufficient to hold the line in place under normal jostling. The retention force is greater in directions other than the direction of the arrow as it is shot from the bow. This directionally dependent release force further reduces the chance of the line being inadvertently discharged. Specifically then, the present invention provides a bow fishing reel including a bottle that may be attached to an archer's bow and into which a line may be loosely bundled, with one end of the line extending from the bottle to be secured to an arrow and the other end secured with respect to the reel. A line retainer prevents discharge of the line from the bottle until a threshold force is applied to the line greater than that provided by the mass of the line.

Thus, it is one object of the invention to provide a line retainer especially suited for bottle-style reels such as normally produce extremely low drag on the retained line.

It is another object of the invention to provide a line retainer that automatically reacts to a threshold force of the arrow and thus does not require the user to remember to release the line before shooting the arrow.

The line retainer may provide an angularly varying threshold force that increases in directions other than the direction of discharge of the arrow from the bow.

Thus, it is another object of the invention to provide a line retainer that is selectively responsive to the desirable release of the line when it is pulled by the arrow.

The bottle may include an open guide ring at an opening of the bottle and the line retainer may be attached near the open guide ring.

Thus, it is another object of the invention to provide a line retainer positioned close to the exit aperture of the line to reduce the length of line that may be subject to snagging or catching.

The line retainer may have a tapered slot into which a portion of the line may be wedged. The line may be held by the elasticity of the line and/or the elasticity of the line retainer body. More generally, the retainer may provide two members biased together to provide a clamping, with a predetermined pressure, of the line between them.

Thus it is another object of the invention to provide a retaining means that is extremely simple to fabricate, reliable to use and easy to inspect in the field.

The foregoing objects and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 1 is a top plan view of the present invention, showing the bow fragmentary, and illustrating the user's finger pulling the trigger level of the reel;

FIG. 2 is a fragmentary side elevational view of FIG. 1, showing the forward portion of the reel partly broken away;

FIG. 3 is a fragmentary view of FIG. 1, shown on a smaller scale, and illustrating the trigger lever of the reel being urged forward by the user's finger, so as to lift the top roller of the device, which will enable the line to be free, for being carried by the bowman's arrow;

FIG. 4 is a fragmentary view of FIG. 2, shown on a smaller scale, and illustrating the top roller free of the line with the user's finger urging the trigger lever forward to do so;

FIG. 5 is a rear side view of FIG. 2, shown on a much smaller scale, and illustrates the archer's finger holding the trigger lever forward before releasing an arrow from his bow which is shown fragmentary;

DETAILED DESCRIPTION OF THE PREFERRED EMBODIMENT

Figure 6:
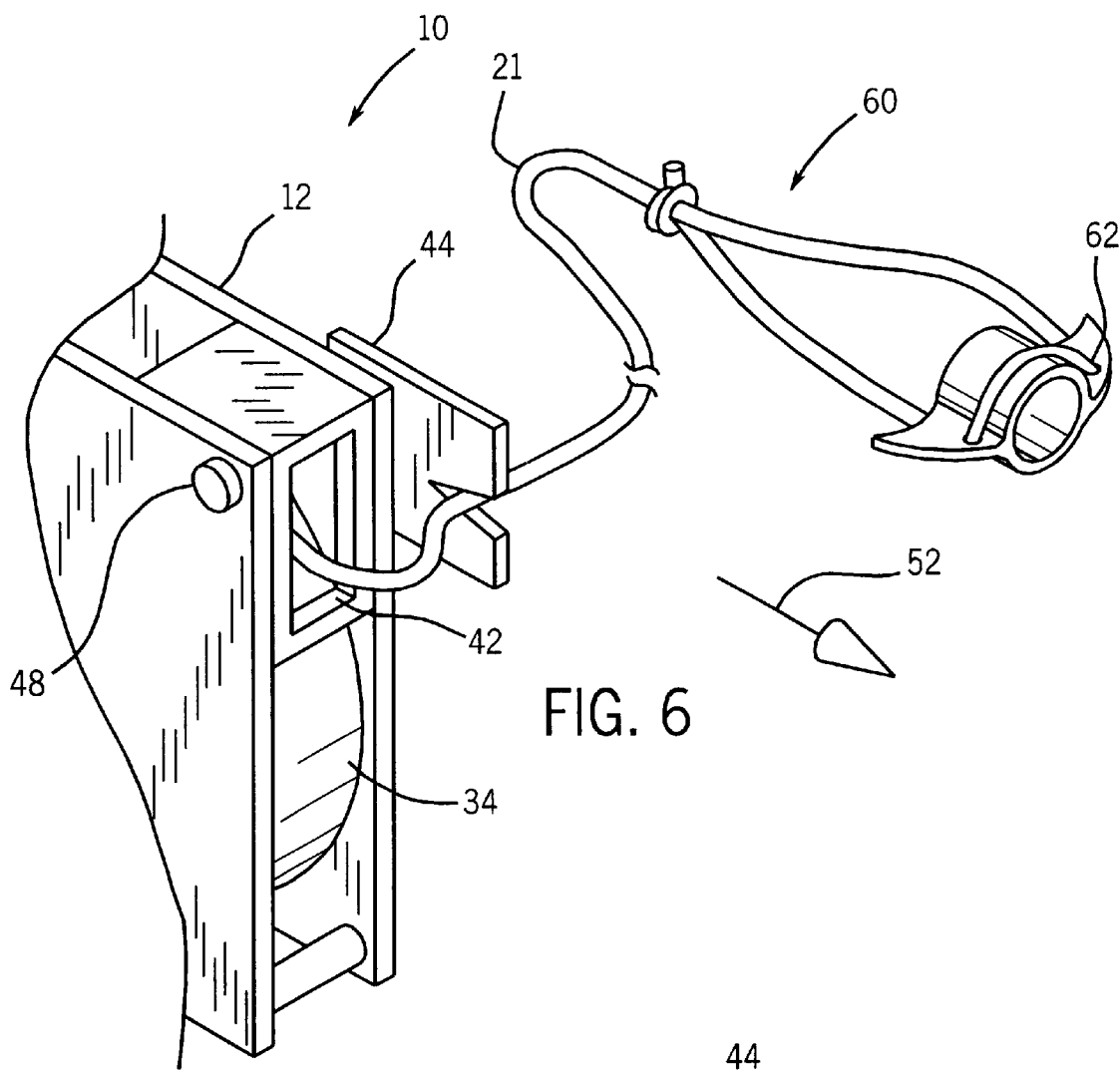
FIG. 6 is a fragmentary perspective view of FIG. 2 showing the line retainer of the present invention engaging a line prior to shooting of an arrow.

A reel 10 suitable for use with the present invention is shown to include a pair of spaced-apart plates 12 of suitable material. Plates 12 are "L"-shaped in configuration, and the lip 13 of one plate 12, is fixedly secured to a longitudinal side edge 14 of a rectangular mounting plate 15, and plate 15 includes a pair of spaced-apart and aligned openings 16, which receive suitable fasteners 11, for mounting to the center portion 16a of a typical archer's bow 17, as may be more clearly seen in FIG. 5 of the drawing.

The neck portion 18, of a plastic bottle 19, is fixedly secured between the plates 12 at the lip portions 13, and bottle 19 is also preferably secured at one of its side surfaces 20, to plate 15, in a suitable manner (not shown). One end of a fishing line 21 is suitably secured to a fishing arrow 22 as illustrated in FIG. 5, and the opposite end of line 21 is received in openings 23 in the rear of bottle 19, where it is suitably secured by knot 24 means, so as to prevent loss of the line 21 and the arrow 22, when the arrow 22 leaves the bowstring 25.

A trigger lever 26 includes a "U"-shaped upper end 27 which is freely received on the upper ends of plates 12, and a pivot pin 26a extends through end 27, and is suitably secured in plates 12, so as to enable trigger lever 26 to pivot, by means of the user's finger 28 of his hand 29, which grips the bow 17. Trigger lever 26 includes a projection 29a, for easy accommodation of the user's finger 28, so as to operate reel 10, in a manner which hereinafter will be described.

A nylon roller 30 is rotatably received on a shaft 31 which is fixedly secured in a suitable manner, within the "U"-shaped end of trigger lever 26. The shaft 31 is, also, freely received in the arcuate slots 32, through plates 12. When trigger lever 26 is in its downward position, roller 30 urges line 21 against the outer periphery 33 of rubber roller 34, so as to enable the user to retrieve line 21 into bottle 19 quickly by the knob 35 and crank handle 36 means. Knob 35 is pivotally secured to pin 45, in one end of crank handle 36, and crank handle 36 is fixedly secured to rotatable shaft 37, having a gear 38 fixedly secured thereto. Gear 38 meshes with gear 39, which is fixedly secured to shaft 40, that carries roller 34, and the gears 38 and 39 are contained within housing 41, which is suitably secured to the outside face of one of plates 12, the aforementioned gearing and cranking arrangement being common in the art.

It shall be noted, that a line guide ring 42 is fixedly secured, in a suitable manner, at its outer periphery 43, to the inside surfaces of plates 12, for unhindered travel of line 21 in both directions.

In use, reel 10 loosely bundles the line 21 in the bottle 19. Line 21 is retrieved by pinching it between the plastic roller 30, of trigger lever 26, and the rubber roller 34. Before the arrow 22 is shot, the trigger lever 26 is pushed forward, as illustrated in FIGS. 3 and 4, pivoting roller 30 upwards, and away from line 21, so as to enable line 21 to feed freely out of its bottle 19, and follow the arrow 22. In retrieving arrow 22, trigger lever 26 is pulled back, which will pivot roller 30 downwards, so as to pinch line 21 against the outer periphery 33 of roller 34, and the crank handle 36, having speed-up gearing, consisting of gears 38 and 39, will drive the rubber roller at high speed, which will pull line 21, so as to feed it into the bottle 19, enabling line 21 to be ready for the next shot.

It shall also be noted that reel 10 is much safer in use than "spin casting" reels because if the user forgets to release the line of such reels, the line will either break, or the arrow will stretch the line, and recoil, striking the shooter. The line of reel 10 is not wound on a spool, thus, there is no twisting of line 21.

It shall further be recognized, that reel 10 can handle more and heavier line 21, such as two hundred feet of number seventy woven line.

Figure 7:
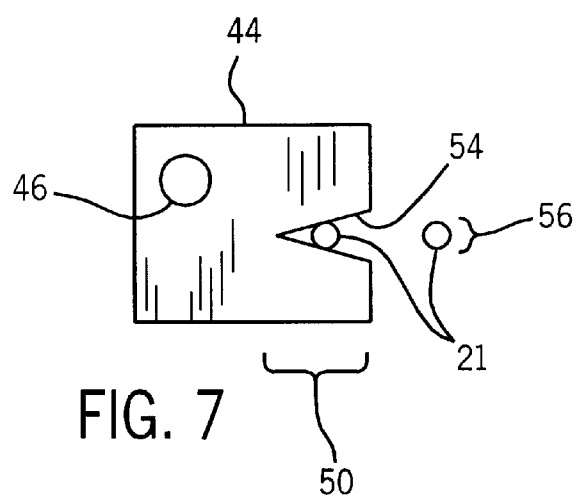
FIG. 7 is a side elevational view of the line retainer removed from the reel of FIG. 6 showing its retaining slot together with a cross-sectional dimension of the line.

Referring now to FIGS. 6 and 7, a line retainer 44 may be affixed to plate 12 adjacent to the line guide ring 42 so as to receive line 21 immediately upon exit of the line 21 from the bottle 19 and thus from the line guide ring 42. The line retainer 44 is generally a rectangular plate having a hole 46 therein to receive a mounting screw 48 passing through plate 12. The mounting screw 48 holds the line retainer 44 abutting the outer vertical surface of plate 12 with a front portion 50 of the line retainer 44 extending forward from the line guide ring 42, next to the line guide ring 42 and generally along a direction 52 being the direction that the line 21 is drawn when pulled by a released arrow 22.

Cut within the front portion 50 and extending along direction 52 to open toward the front of the retainer 44 is a tapered slot 54 into which the line 21 may be pressed. The slot 54 narrows as one moves backwards against direction 52 to a dimension smaller then the cross sectional diameter 56 of the line 21. As such, a portion of the line 21 arranged generally perpendicular to the direction 52, may be fit within the slot 54 and wedged against a rear portion of the slot 54 to be held thereby. Nevertheless, because the slot 54 widens in the direction 52, a pulling of the line 21 in direction 52 by the arrow 22 will quickly release the line 21 from the slot 54 by drawing it to a wider portion of the slot and then out of the slot altogether.

While the wedging interaction of the line 21 and slot 54 may rely on the elasticity of the line 21 as its cross-section is deformed by the slot 54, the material of the line retainer 44 may also be slightly elastic, for example, constructed of a polyurethane material so as to provide additional clamping force on the line 21. Thus, it will be understood that the present invention works equally well if the clamping is the result of deformation of the line 21 or deformation of the retainer 44. More generally, the line retainer can be a spring-biased clamp having two opposed members that clamp the line 21 as the sides of the slot 54 clamp the line 21.

The clamping of the line 21 is set such that the line is not loosed simply by the force of gravity or acceleration acting on the mass of the line during normal jostling of the bow. It will be understood that when the line 21 is engaged in the slot 54, it extends generally perpendicular to the direction 52 and that force is directed perpendicular to direction 52 will act with limited effect in disengaging line 21 and that forces not along direction 52 will be met with continued resistance and possibly even greater resistance than forces along direction 52. Thus, the line retainer 44 provides an angularly varying threshold of force.

The mechanism of the retainer 44 is such that it may grip the line 21 at any portion along its length and thus a free portion 60 of line 21 extending beyond retainer 44 may be freely adjusted so that the line 21 may be attached to an arrow 22 with a user-selected amount of slack. Ideally, free portion 60 is decreased to the extent possible to reduce the chance of it catching or snagging. In this regard, the line 21 may be attached at the front of the drawn arrow 22 (shown in FIG. 5) to be adjacent to the line guide ring 42, this point of attachment sliding back along the shaft of the arrow 22 to a stop (not shown) so that the line is in the preferential trailing configuration as the arrow 22 flies through the air. Slide 62 fitting over the shaft of the arrow 22 facilitates this sliding back action and is described in U.S. Pat. No. 6,517,453 entitled: Bow fishing Arrow Attachment, filed Jun. 26, 2001 assigned to the same assignee as, and co-pending with, the present application, and hereby incorporated by reference.

It is specifically intended that the present invention not be limited to the embodiments and illustrations contained herein, but that modified forms of those embodiments including portions of the embodiments and combinations of elements of different embodiments also be included as come within the scope of the following claims.

I claim:

1. A bow fishing reel for an archer's bow, comprising:
   a bottle into which a line may be loosely bundled, with one end of the line extending from the bottle to be secured to an arrow and the other end secured with respect to the reel;
   a means for attaching the bottle to an archer's bow;
   a line retainer preventing discharge of the line from the bottle until a threshold force is applied to the line greater than that provided by the mass of the line;
   wherein the bottle includes an open guide ring through which the line may pass and wherein the line retainer is attached to the reel adjacent to the open guide ring.

2. The bow fishing reel of claim 1 wherein the line retainer provides a varying threshold force that increases with deviation along an axis defined by the direction of discharge of the arrow from the bow when the reel is mounted on the bow.

3. The bow fishing reel of claim 2 wherein the line retainer includes a slot into which a portion of the line may be wedged, the slot tapering along the axis to engage the line with insertion of a portion of the line into the slot along the axis.

4. A bow fishing reel for an archer's bow, comprising:
   a bottle into which a line may be loosely bundled, with one end of the line extending from the bottle to be secured to an arrow and the other end secured with respect to the reel;
   a means for attaching the bottle to an archer's bow;
   a line retainer preventing discharge of the line from the bottle until a threshold force is applied to the line greater than that provided by the mass of the line;
   wherein the line retainer includes a tapered slot into which a portion of the line may be wedged.

5. The bow fishing reel of claim 4 wherein the line retainer is constructed of an elastic material contributing an elastic clamping of the line by the slot.

6. The bow fishing reel of claim 5 wherein the line retainer is substantially inelastic and the retention of the line relies on the compression of the elastic line in the tapered slot.

7. A bow fishing reel for an archer's bow, comprising:
   a bottle into which a line may be loosely bundled, with one end of the line extending from the bottle to be secured to an arrow and the other end secured with respect to the reel;
   a means for attaching the bottle to an archer's bow;
   a line retainer preventing discharge of the line from the bottle until a threshold force is applied to the line greater than that provided by the mass of the line;
   wherein the line retainer includes two members biased together to provide a clamping of the line between them.

8. The bow fishing reel of claim 7 further including a line retractor means for pushing the line into the bottle before use.

9. The bow fishing reel of claim 8 wherein the line retractor means is a pair of opposed wheels engaging the line at a mouth of the bottle, one wheel communicating with a manually operable crank mechanism.

* * * * *